July 14, 1959 — F. F. EHRICH — 2,894,589
JET PROPELLED HELICOPTER ROTOR
Filed Aug. 12, 1955 — 2 Sheets-Sheet 1
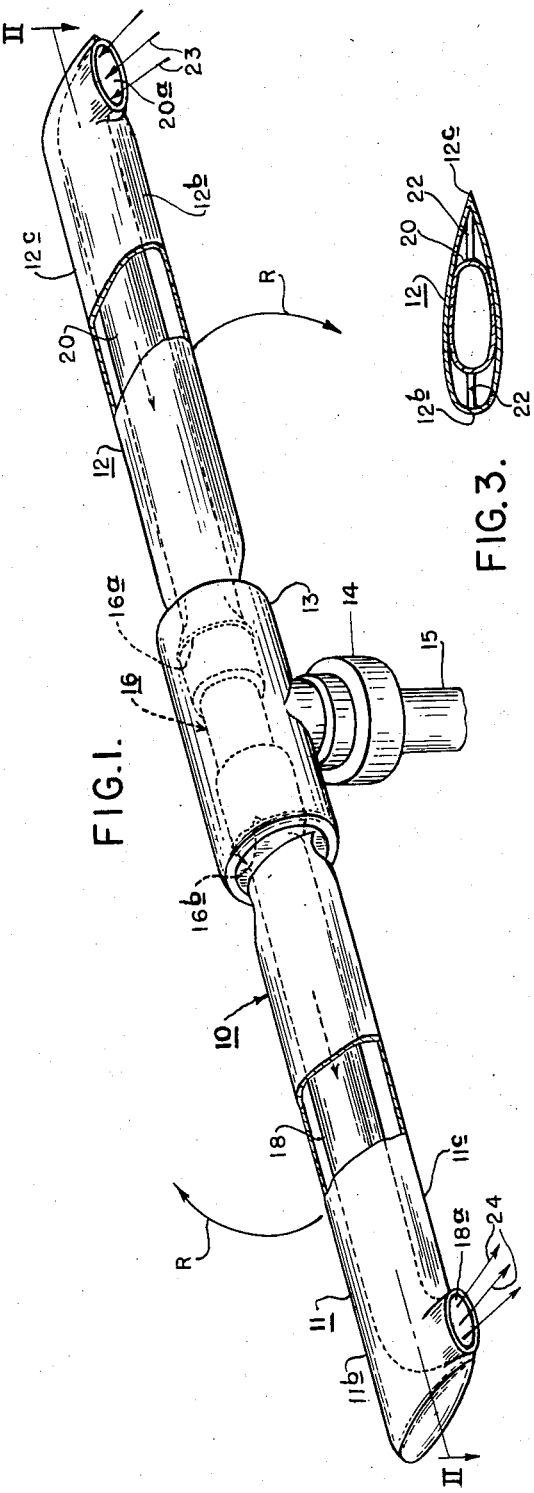
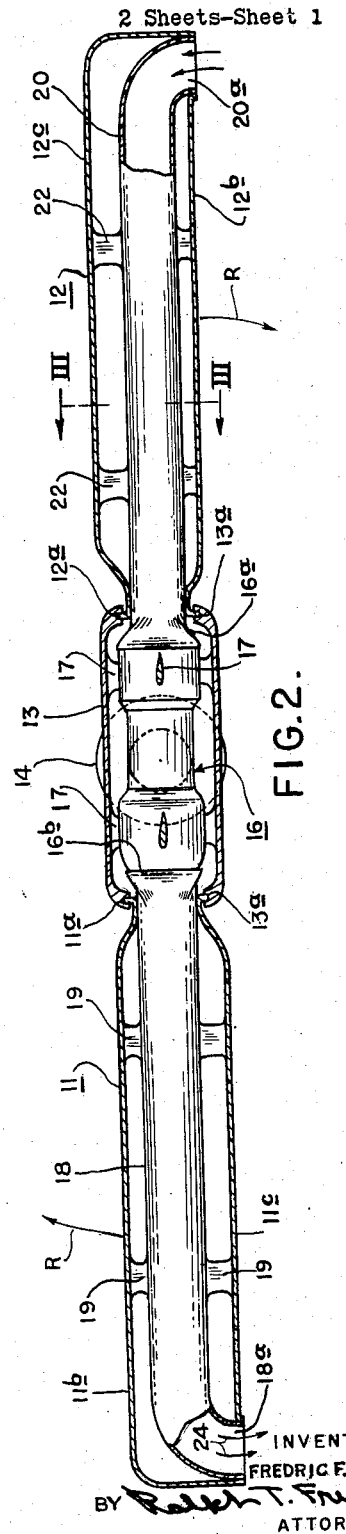
INVENTOR
FREDRIC F. EHRICH
BY Robert T. French
ATTORNEY July 14, 1959
F. F. EHRICH
2,894,589
JET PROPELLED HELICOPTER ROTOR
Filed Aug. 12, 1955
2 Sheets-Sheet 2
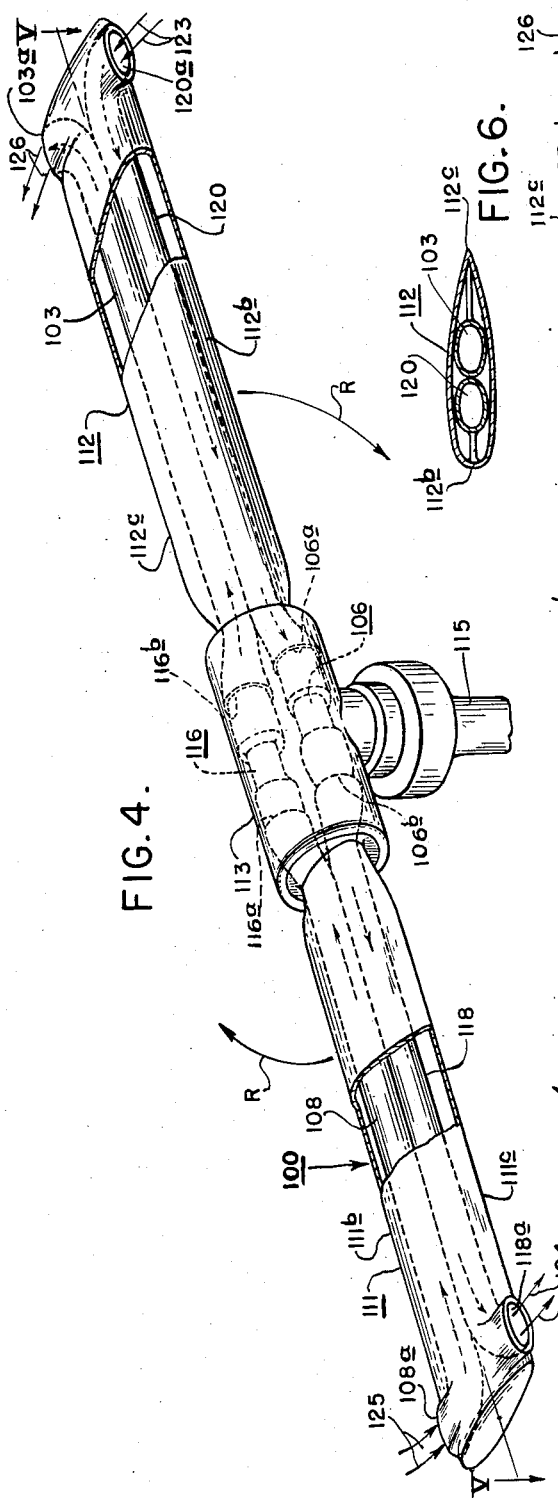
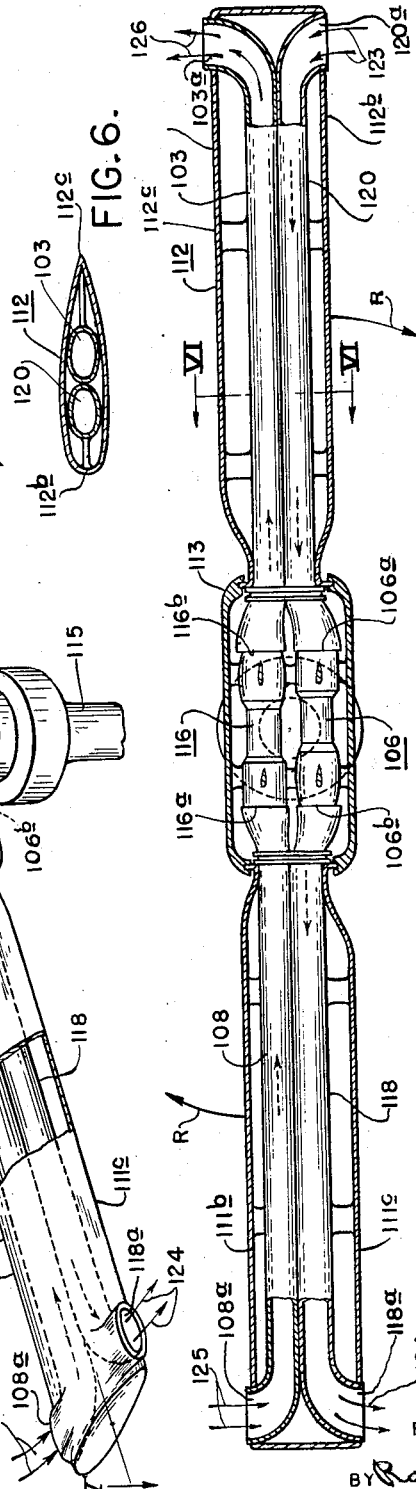
INVENTOR
FREDRIC F. EHRICH
BY Ralph T. French
ATTORNEY

United States Patent Office 2,894,589
Patented July 14, 1959

2,894,589
JET PROPELLED HELICOPTER ROTOR

Fredric F. Ehrich, Philadelphia, Pa., assignor to Westinghouse Electric Corporation, East Pittsburgh, Pa., a corporation of Pennsylvania Application August 12, 1955, Serial No. 528,038

5 Claims. (Cl. 170—135.4)

This invention relates to helicopters, more particularly to a jet propelled helicopter rotor, and has for an object to provide an improved arrangement therefor.

It is another object of the invention to provide a jet propelled helicopter rotor in which the centrifugal mechanical loading on the engine is considerably reduced.

A further object is to provide a rotor of the above type in which the gyroscopic movements of the engine apparatus are considerably reduced.

A more specific object is to provide a jet propelled helicopter rotor in which the jet propulsion apparatus is mounted at the hub of the rotor and the tips of the rotor blades are provided with openings for receiving the incoming air for the jet propulsion apparatus and discharging motive exhaust gases therefrom.

In accordance with the invention, a helicopter rotor pivotally supported at the center of rotation upon a vertical column, is provided with a hollow hub portion within which is received a jet propulsion engine of any desired type, such as a ram jet engine or a turbo-jet engine. The opposed blades of the rotor are provided with axially extending passages communicating with the air inlet and the jet exhaust openings of the engine and extending in opposite direction to the tips of the rotor blades. At the tips of the blades, the direction of the passages is changed, so that the exhaust passage outlet is disposed in the trailing edge of its rotor blade while the air intake opening is disposed in the leading edge of its rotor blade. Thus, in operation, as the jet exhaust from the engine issues from its outlet to drive the rotor, the air intake opening is swept in the same circular orbit to receive air by the well known "ram effect" with attendant obvious aerodynamic advantages.

In a second embodiment, where two jet propulsion engines are utilized, the exhaust outlets and air intake openings are arranged in substantially the same manner, so that each of the pair of rotor blades is provided at its tip with an air intake at its leading edge and an exhaust outlet at its trailing edge.

The above and other objects are effected by the invention as will be apparent from the following description taken in connection with the accompanying drawings, forming a part of this application, in which:

Fig. 1 is a perspective view of a dual bladed helicopter rotor having the invention incorporated therein;

Fig. 2 is an axial section taken on line II—II of Fig. 1 looking in the direction indicated by the arrows;

Fig. 3 is a section taken on line III—III of Fig. 2 looking in the direction indicated by the arrows;

Fig. 4 is a perspective view similar to Fig. 1 but showing a second embodiment;

Fig. 5 is an axial section taken on line V—V of Fig. 4 looking in the direction indicated by the arrows; and Fig. 6 is a section taken on line VI—VI of Fig. 5 looking in the direction indicated by the arrows.

Referring to Figs. 1 and 2 of the drawings in detail, there is shown a helicopter rotor 10 having a pair of diametrically opposed blades 11 and 12 carried by a central T-shaped hub member 13 of tubular form. The hub 13 is rotatably supported in a bearing housing 14 provided in a vertical column 15 which in turn is carried by the helicopter fuselage (not shown).

According to the invention, a jet propulsion engine 16, such as a turbo-jet or a ram jet for example, is anchored in a central position within the hub 13 in any desired manner. As illustrated, the engine 16 is connected to the hub by a plurality of radial struts 17, with its air inlet 16a disposed adjacent the rotor blade 12 and its gas discharge outlet 16b disposed adjacent the rotor blade 11.

The rotor blades 11 and 12 are preferably of typical air-foil form and hollow and are provided with circular flange portions 11a and 12a, respectively, rotatably received in mating grooves 13a provided in the hub member 13. The blade 11 has a leading edge 11b and a trailing edge 11c. Similarly, blade 12 is provided with a leading edge 12b and a trailing edge 12c. Blade 11 has a longitudinal tubular duct 18 rigidly supported therein by means of struts 19, for example, extending from the gas discharge outlet 16b of the jet engine to the trailing edge 11b of the blade. The duct 18 is provided with a generally elliptical outlet 18a which may be smoothly faired into the trailing edge 11c and is disposed adjacent the outermost tip of the blade 11.

In a similar manner, blade 12 is provided with a longitudinally extending duct 20 connected at one end to the air inlet 16a of the jet engine and having its other end extending through the leading edge 12b of the blade in the region adjacent the outermost tip thereof. The duct 20 is provided with an air intake opening 20a of preferably elliptical shape which is smoothly faired into the leading edge 12b. The duct 20 is rigidly supported within the blade by a plurality of struts 22 or other suitable means.

As best shown in Fig. 2, the turbojet engine 16 is disposed with its longitudinal axis in substantial alignment with the longitudinal axes of the ducts 18 and 20.

In operation, incoming air is received in the intake 20a of the blade 12, as indicated by the arrows 23, and passes through the duct 20 into the air inlet 16a of the jet engine 16. The air received in the jet engine 16 supports combustion of fuel, in a well known manner, and is then ejected through the gas discharge outlet 16b of the engine into the discharge duct 18 and is emitted from the exhaust outlet 18a in the form of a propulsive jet, as indicated by the arrows 24, to cause the rotor to rotate in the direction of the arrow R.

As the rotor assumes normal speed, the tip linear velocity of the blades 11 and 12 becomes relatively high, for example, it may assume sonic velocity. The action of the leading edge 12b of the blade 12 cutting into the air provides a very effective "ram effect" which serves to increase the pressure of the incoming air in the duct 20 which, as is well known in the art, is a desirable feature in jet engine propulsion.

Also, since the engine 16 is mounted at the center of the rotor and since the ducts 18 and 20 extend outwardly from opposite ends of the hub 13 and are of substantially the same length and size, a well balanced arrangement is provided reducing the high gyroscopic moments and centrifugal forces usually encountered in helicopter rotors driven by jet engines.

Means for operating the engine 16, that is, fuel lines, electrical lines, and instrumentation connections, are not shown since they form no part of the invention. However, they may be directed through the column 15 into the fuselage. Also, the means for controlling oscillation of the blades 11 and 12 within the grooves 13a of the hub during rotation, although not shown since they form no part of the invention, may be of any desired type.

Referring to Figs. 4 and 5, wherein another embodiment of the invention has been shown, the helicopter rotor 100 is provided with a central hub 113 rotatably mounted upon a vertical column 115 and carrying at either end thereof a pair of diametrically opposed blades 111 and 112. As in the first embodiment, the blades 111 and 112 are of hollow tubular airfoil shape with trailing edges 111c and 112c, respectively, and leading edges 111b and 112b, respectively. The blades 111 and 112 are rotatably supported at their inner ends in the hub 113 in a manner similar to that shown in the first embodiment.

In this embodiment, a pair of jet propulsion engines 116 and 106 are received in side-by-side relation within the hub 113. The engines 116 and 106 are preferably of substantially equal size and weight and are disposed in reversed gas flow relation relative to each other, for a purpose which will subsequently be described, so that the air inlet 116a of the egine 116 is disposed at one end of the hub while the air inlet 106a of the engine 106 is disposed at the other end of the hub member. Thus, the gas discharge outlet 116b of the engine 116 is disposed beside the air inlet 106a while the gas discharge outlet 106b is disposed beside the air inlet 116a.

The blade 111 is provided with a duct 118 connected at one end to the engine discharge outlet 106b and extending longitudinally through the blade to the trailing edge 111c at the outer most tip of the blade to form an exhaust opening 118a. The blade 111 is also provided with a second duct 108 connected at one end to the air inlet 116a of the engine 116 and having its other end extending through the leading edge 111b to form an air intake opening 108a.

Blade 112 is provided with a longitudinally extending duct 120 communicating at one end with the air inlet 106a of the jet engine 106 and having an air intake opening 120a at its other end in the leading edge 112b of the blade at the outermost tip thereof. The blade 112 is also provided with a second longitudinal duct 103 connected at its inner end to the discharge outlet 116b of the engine 116 and having its exhaust outlet opening 103a disposed in registry with the trailing edge 112c at the outermost tip of the blade.

As best shown in Fig. 5, the turbojet engine 116 is disposed with its longitudinal axis in substantial alignment with the longitudinal axes of the ducts 103 and 108, while the turbojet engine 106 is disposed with its longitudinal axis in substantial alignment with the longitudinal axes of the ducts 118 and 120.

From the above it will be seen that the rotor 100 is provided with a longitudinal passageway for each of the engines 106 and 116 extending through the rotor from one tip of the blade 111 to the other tip of the blade 112 and that the air flow to each of the engines and the gas discharge therefrom is in opposite directions.

In operation, air enters the air intake opening 120a, as indicated by the arrows 123, flows through the duct 120 into the air inlet 106a of the jet engine 106, where it supports combustion of fuel supplied thereto to form a motive gas, and then flows through the discharge outlet 106b of the engine. The discharge gas then flows through the duct 118 and through the gas exhaust outlet 118a, as indicated by the arrow 124, in the form of a propulsive jet to impart a rotative thrust to the rotor in the direction indicated by the arrow R.

In a similar manner, and concomitantly therewith, incoming air is received through the air intake 108a, as indicated by the arrow 125, and passes through the duct 108, into the inlet 116a of the jet engine 116, wherein it supports combustion of fuel to form a motive gas which is discharged through the discharge outlet 116b of the engine. The discharge gas then flows through the duct 103 and through the exhaust outlet 103a, as indicated by the arrow 126, in the form of a propulsive jet which also imparts a rotative thrust to the rotor.

The propulsive jets 124 and 126 are exerted at opposite ends of the blades and in opposite directions, causing the rotor to rotate in the direction of the arrow R. As mentioned in connection with the first embodiment, upon rotation of the rotor, the air is received in the intake openings 108a and 120a with a substantial "ram effect" caused by the sweeping through the air of the leading edges 111b and 112b of the blades. As the rotor assumes normal speeed, the ram effect becomes sufficiently high to provide an advantageous pressurization of the air within the ducts 108 and 120.

In this embodiment also, a balanced arrangement is provided which considerably reduces gyroscopic moments and centrifugal forces. When the jet engines 106 and 116 are in the form of ram jets which have no rotating parts, no gyroscopic moments are set up within the engines. However, when the engines 106 and 116 assume the form of turbo-jets, the rotors (which form an essential component of such engines) have substantial individual gyroscopic moments which would otherwise be detrimental to the rotor. However, with the arrangement shown, the rotors are preferably of substantially the same size and rotation characteristics, and since the engines 106 and 116 are in reversed side-by-side relation, the opposite rotation of the rotors of the two engines nullifies the gyroscopic moments, so that the net gyroscopic effect of the turbo-jets is zero.

It will now be seen that the invention provides an arrangement wherein small jet engines may be mounted within the rotor in a manner which avoids the heretofore undesirable gyroscopic effects and the centrifugal force effects in a simple and expedient manner. Also, with the above arrangement a ram effect for the incoming air to the jet engines is provided without the necessity of mounting the jet engines on the tips of the blades where their mass would create undesirable problems.

While the invention has been shown in several forms, it will be obvious to those skilled in the art that it is not so limited, but is susceptible of various other changes and modification without departing from the spirit thereof.

What is claimed is:

1. A helicopter rotor having a central hub portion, a pair of blades supported at said hub portion and extending radially outwardly therefrom, a jet propoulsion engine having an air inlet and a gas discharge outlet, said jet propulsion engine being disposed in a central position in said hub portion and jointly rotatable therewith, each of said blades being of substantially air-foil shape and having a leading edge and a trailing edge, means providing an air intake opening in the leading edge of one of said blades, means providing an exhaust outlet in the trailing edge of the other of said blades, means providing a longitudinal passage in each of said blades, means including one of said passages providing a communication between the intake opening in said leading edge and said engine inlet, and means including the other of said passages providig a communication between said engine discharge outlet and the exhaust outlet in said trailing edge, said engine being disposed with its longitudinal axis in substantial alignment with the longitudinal axes of said passages.

2. The structure recited in claim 1 in which said blades are provided with outermost tip portions and said trailing edge exhaust outlet opening and said leading edge intake opening are disposed adjacent said tip portions.

3. A helicopter rotor having a central hub portion, a pair of blades supported at said hub portion and extending radially outwardly therefrom, and a pair of jet propulsion engines disposed in a central position within said hub portion in reversed side-by-side relation and jointly rotatable therewith, each of said engines having an air inlet and a gas discharge outlet, each of said blades being of substantially air-foil shape and having a leading edge and a trailing edge, means providing an air intake opening in each of said leading edges, means providing an axhaust outlet opening in each of said trailing edges, means providing a first passage between the discharge outlet of each of said engines and each of said trailing edge exhaust outlets, and means providing a second passage between each said leading edge intake opening and each of said engine inlets, each of said engines being disposed with its longitudinal axis in substantial alignment with the associated first passage and second passage.

4. The structure recited in claim 3 in which said engines are substantially identical in size and weight, said blades are probided with outermost tip portions, and said trailing edge exhaust outlets and said leading edge intake openings are disposed adjacent said tip portions.

5. The structure recited in claim 3 in which said engines are turbo-jets having rotary elements of substantially identical size, weight and rotational speed characteristics, whereby in operation the gyroscopic moments due to the rotation of the engine elements about the engine axes are substantially equal and in opposite directions.

References Cited in the file of this patent

UNITED STATES PATENTS

| | | |
|---|---|---|
| 2,394,513 | Chappedelaine | Feb. 5, 1946 |
| 2,474,359 | Isacco | June 28, 1949 |
| 2,516,489 | Stalker | July 25, 1950 |
| 2,745,498 | Nagler | Mar. 15, 1956 |

FOREIGN PATENTS

| | | |
|---|---|---|
| 489,231 | Germany | Jan. 15, 1930 |

UNITED STATES PATENT OFFICE
CERTIFICATE OF CORRECTION

Patent No. 2,894,589            July 14, 1959

Fredric F. Ehrich

It is hereby certified that error appears in the printed specification of the above numbered patent requiring correction and that the said Letters Patent should read as corrected below.

Column 1, line 22, for "movements" read -- moments --; line 29, after the syllable "ing" insert -- the --; column 3, line 21, for "egine" read -- engine --; column 4, line 61, for "providig" read -- providing --; column 5, line 16, for "probided" read -- provided --.

Signed and sealed this 1st day of December 1959.

(SEAL)
Attest:

KARL H. AXLINE
Attesting Officer

ROBERT C. WATSON
Commissioner of Patents